United States Patent [19]

Nemoto

[11] Patent Number: 4,932,278
[45] Date of Patent: Jun. 12, 1990

[54] TRANSMISSION FOR SELF-PROPELLED WORKING VEHICLES

[75] Inventor: Shusuke Nemoto, Yao, Japan

[73] Assignee: Kanzaki Kokyukoki Mfg. Co., Ltd., Amagasaki, Japan

[21] Appl. No.: 348,284

[22] Filed: May 5, 1989

[30] Foreign Application Priority Data

May 30, 1988 [JP] Japan .................. 63-71274[U]

[51] Int. Cl.$^5$ .................................. F16H 3/08
[52] U.S. Cl. .................................. 74/371
[58] Field of Search ............... 74/371, 372; 475/198, 475/200, 203, 206

[56] References Cited

U.S. PATENT DOCUMENTS

| | | | |
|---|---|---|---|
| 4,103,566 | 8/1978 | von Kaler et al. | 74/701 |
| 4,662,241 | 5/1987 | Edwards | 74/701 |
| 4,713,983 | 12/1987 | Rundle | 74/701 |

FOREIGN PATENT DOCUMENTS 61-135047 8/1986 Japan .

*Primary Examiner*—Dirk Wright

[57] ABSTRACT

Speed-change shaft (12) of a key-shift transmission mechanism (15) is divided axially into hollow first and second shaft halves (21, 23) through which one (14) of co-axially disposed wheel axles (13, 14) extends. A plurality of speed-change gears (17F$_1$-17F$_5$) are rotatably mounted on the first shaft half (21), whereas a shifter sleeve (22) for shifting a gear-coupling shift key (19) is slidably mounted on the second shaft half (23). A brake drum (25) including therein an aperture (25a) for passing the shift key is sandwiched between and engaged to the shaft halves for prividing a vehicle-braking brake (24) within the casing (10). The second shaft half (23) may preferably be made of a polymer material for cost- and weight-reducing purposes. A key-receiving axial groove (18) may be formed in each of the shaft halves (21, 23) with ease because of a shortness of such each shaft half. In a preferred embodiment, a speed-reduction shaft (29) is disposed co-axially with and in close proximity to a drive shaft (11) of the transmission mechanism (15) for interposing two sets of reduction gear trains between the change shaft (12) and wheel axles (13, 14) in a compact fashion.

6 Claims, 4 Drawing Sheets

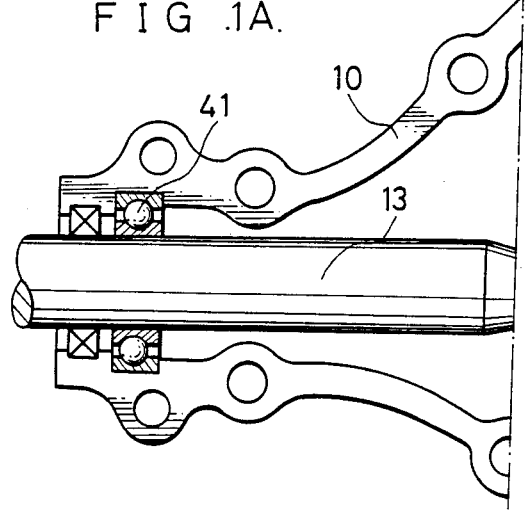
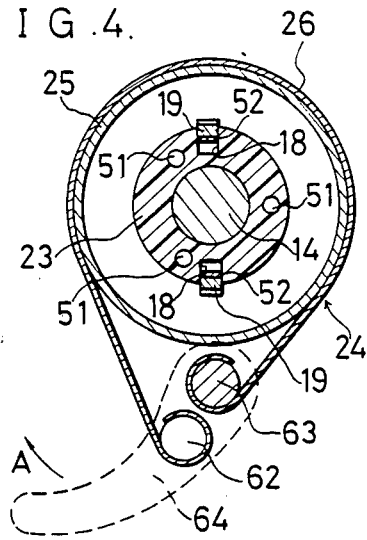
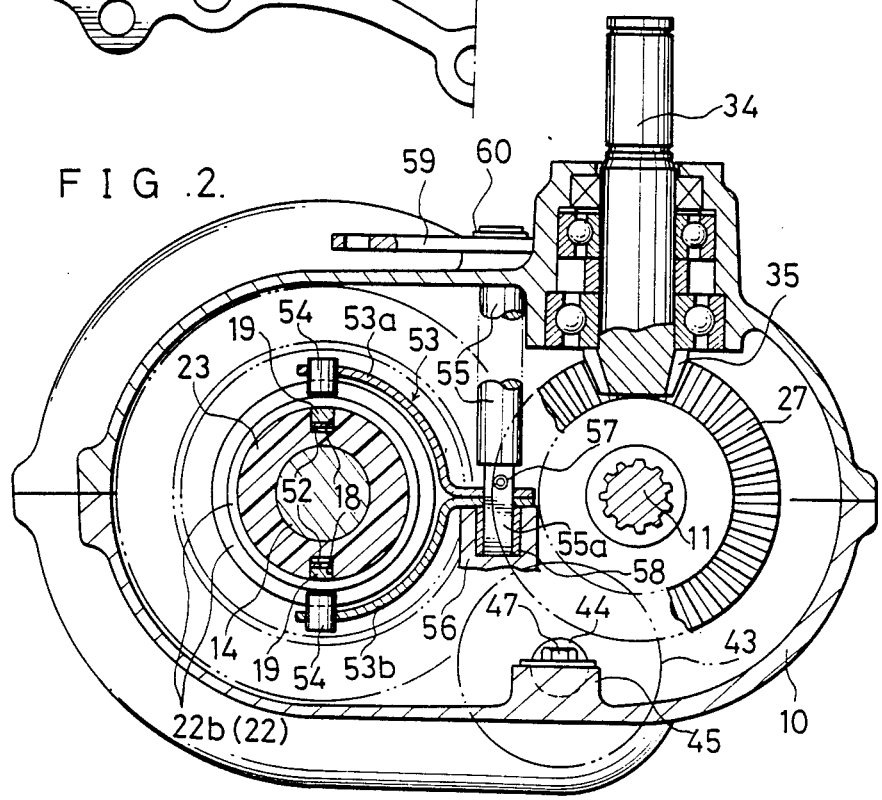

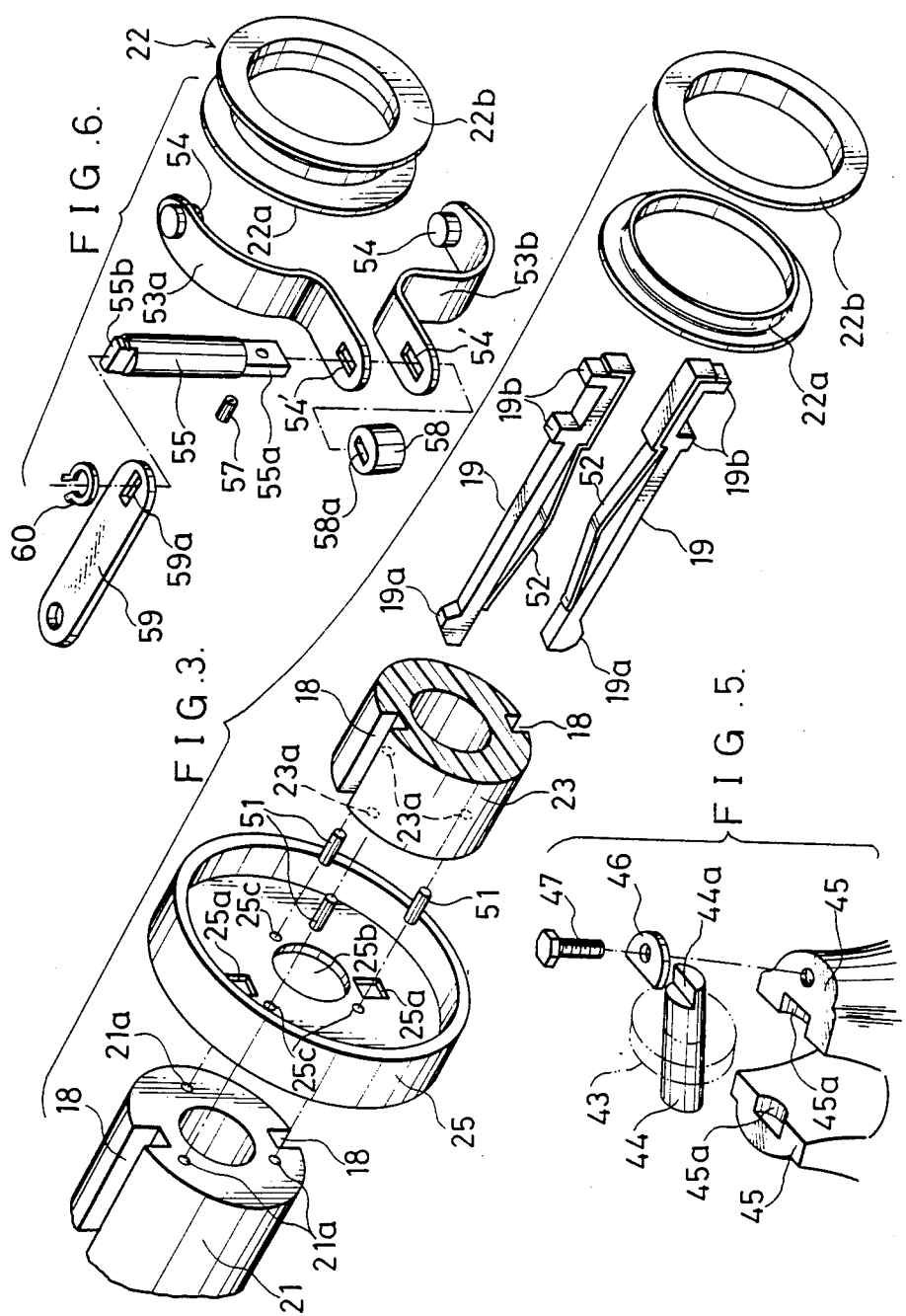

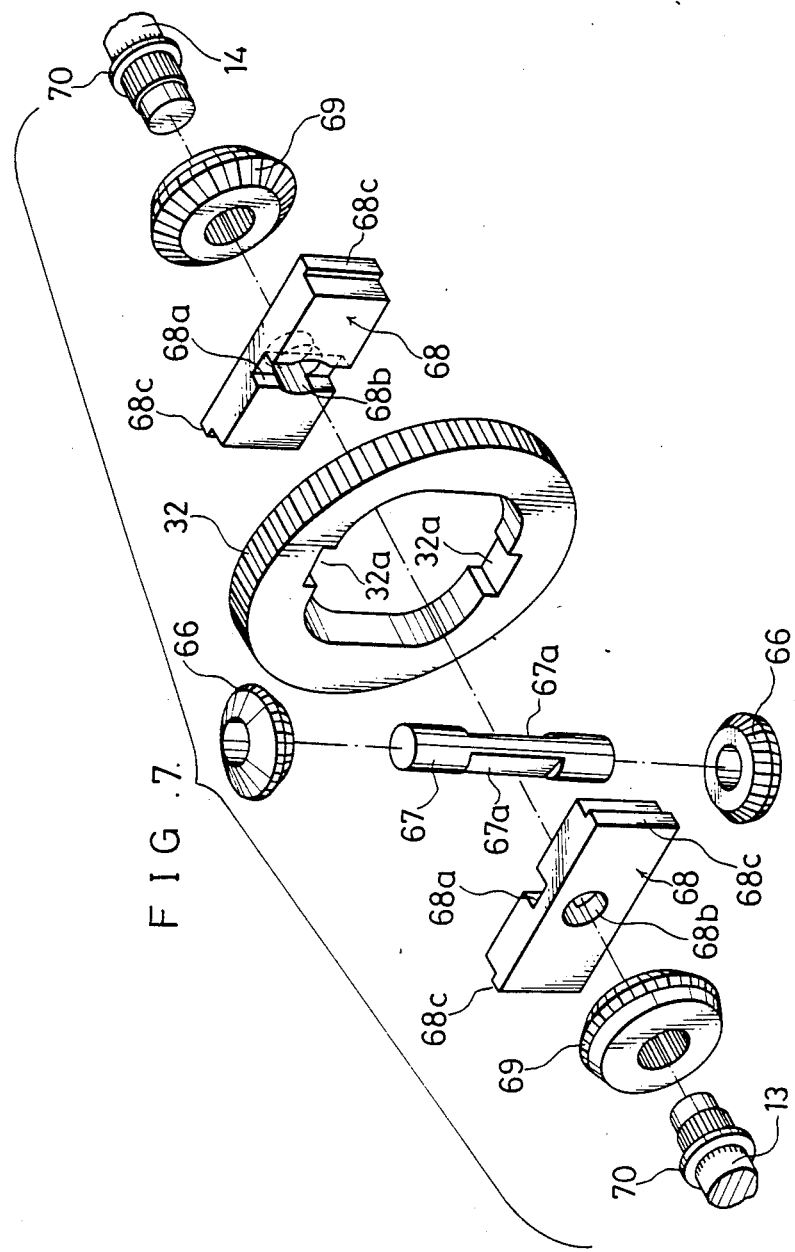

TRANSMISSION FOR SELF-PROPELLED WORKING VEHICLES

FIELD OF THE INVENTION

This invention relates to a transmission adapted for use in relatively small-sized working vehicles such as self-propelled walking mowers and mower tractors.

More particularly, the present invention relates to a transaxle-type transmission having left and right wheel axles journalled by a transmission casing in which a key-shift transmission mechanism is provided having a plurality of speed-change gear trains disposed between drive and speed-change shafts and a shift key associated to the speed-change shaft for actuating the speed-change gear trains one at a time.

BACKGROUND OF THE INVENTION

As is disclosed in, for example, U.S. Pat. No. 4,103,566 and JP,A(U)(Japanese Utility Model Publication under Art. 13bis of the Japanese Utility Model Law) No. 61-135047, a transmission of the type set forth above is, in general, fashioned such that a key-shift transmission mechanism is disposed in a power transmission path relatively at an upstream portion where a relatively low torque is transmitted. For heightening vehicle-driving force, the speed-change shaft of key-shift transmission mechanism is connected to wheel axles through a reduction gearing. On an outer surface of transmission casing is disposed a brake for braking the vehicle which brake is associated to the speed-change shaft or to a speed-reduction shaft for the reduction gearing.

For example, the transmission disclosed in U.S. Pat. No. 4,103,566 is fashioned such that, while a drive shaft is located between a speed-change shaft and co-axially disposed wheel axles, two sets of speed-reduction gear trains are interposed between the speed-change shaft and wheel axles by utilizing larger and smaller two gears rotatably mounted on the drive shaft. One end of the speed-change shaft extends outwardly from the transmission casing and has thereon a co-rotatable rotor which is braked for a vehicle-braking purpose. In the transmission disclosed in JP, A(U) No. 61-135047 referred to above, speed-reduction shaft is additionally interposed between a speed-change shaft and wheel axles and one and another speed-reduction gear trains are disposed between the speed-change shaft and speed-reduction shaft and between the speed-reduction shaft and wheel axles. One end of the speed-reduction shaft extends outwardly from the transmission casing and carries thereon a brake drum which is adapted to be braked by means of internal brake shoes.

U.S. Pat. No. 4,662,241 discloses a transmission including a key-shift transmission mechanism which has a very compact structure adapted for use in a small-sized working vehicle. As shown in FIGS. 1 and 2 of this U.S. patent, a set of drive gears are mounted rotatably on one of the left and right wheel axles and are driven to rotate by an input bevel gear, having an integral spur gear, which is mounted rotatably on a speed-change shaft. A set of speed-change gears meshing respectively with the drive gears are mounted rotatably on the speed-change shaft and are coupled to the change shaft one at a time using a shift key for a speed-change purpose. The speed-change shaft is connected to the wheel axles through a speed-reduction gear train. No brake is provided.

In each of the transmissions referred to above, a differential gearing is disposed between left and right wheel axles for a smooth turn of vehicle. A final gear of the speed-reduction gearing is used as an input gear of such differential gearing. Speed-change shaft is formed of a solid shaft and is journalled at both ends thereof in a transmission casing.

Although a set of speed-change gears for a key-shift transmission mechanism are disposed on a speed-change shaft such that they are almost in contact with one another, a relatively lengthy shaft is employed as the speed-change shaft. This is because such speed-change shaft further mounts a slidable shifter sleeve which is displaced axially of the change shaft for shifting a gear-coupling shift key by a distance corresponding to an axial width occupied by the speed-change gears. A solid speed-change shaft according to the prior art is disadvantageous with respect to material cost of a transmission. Machining for forming an elongated key-receiving axial groove in the outer surface of a lengthy change shaft will highten the cost. Such lengthy, solid shaft is also disadvantageous with respect to weight of the transmission.

The prior art transmission including a brake which is disposed on an outer surface of transmission casing so as to brake a transmission shaft projected outwardly of the casing requires a brake case on the transmission casing and also a prolonged shaft. Accordingly, such transmission is disadvantageous with respect to manufacturing cost, compactness and weight of the transmission.

As compared to the structure disclosed in U.S. Pat. No. 4,662,241, referred to above, which includes only one reduction gear train between a speed-change shaft and wheel axles, the structure known from U.S. Pat. No. 4,103,566 and JP, A (U) No. 61-135047, referred to above, which includes two sets of reduction gear trains is advantageous in that speed change is attained at a lower torque portion and then vehicle-driving torque may be enlarged without any trouble. However, the former structure reduces the size of a transmission casing in a direction across plural transmission shafts disposed in parallel within the transmission casing, whereas the last-mentioned structure increases number of transmission shafts disposed in parallel within a transmission casing and, therefore, increases the size of transmission casing in a direction across such transmission shafts.

OBJECTS

Accordingly, a primary object of the present invention is to provide a novel transaxle-type transmission, including a key-shift transmission mechanism, in which a speed-change shaft and a brake are provided in a fashion so as to reduce cost and weight of the transmission and so as to heighten compactness of the transmission.

Another object of the present invention is to provide a novel transmission structure which is fashioned to transmit rotation of a speed-change shaft to wheel axles through two sets of reduction trains while keeping a compactness of the transmission.

BRIEF DESCRIPTION OF THE DRAWINGS

Other objects and advantages of the invention will become readily apparent as the specification is considered in conjunction with the accompanying drawings, in which:

FIG. 1A is a sectional plan view of an end portion of the transmission which portion is cut away from FIG. 1;

FIG. 2 is a sectional view taken generally along line II—II of FIG. 1;

FIG. 3 is a perspective view, showing a part of a speed-change shaft and some members employed in the transmission shown in FIGS. 1 and 2;

FIG. 4 is a sectional view taken generally along line IV—IV of FIG. 1;

FIG. 5 is a perspective view, illustrating a way for supporting a reversing idler gear employed in the transmission shown in FIGS. 1 and 2;

FIG. 6 is a perspective view, showing various members of a shift mechanism employed in the transmission shown in FIGS. 1 and 2; and FIG. 7 is a perspective view, showing various members of a differential gearing employed in the transmission shown in FIGS. 1 and 2.

SUMMARY OF THE INVENTION

Figure 1:
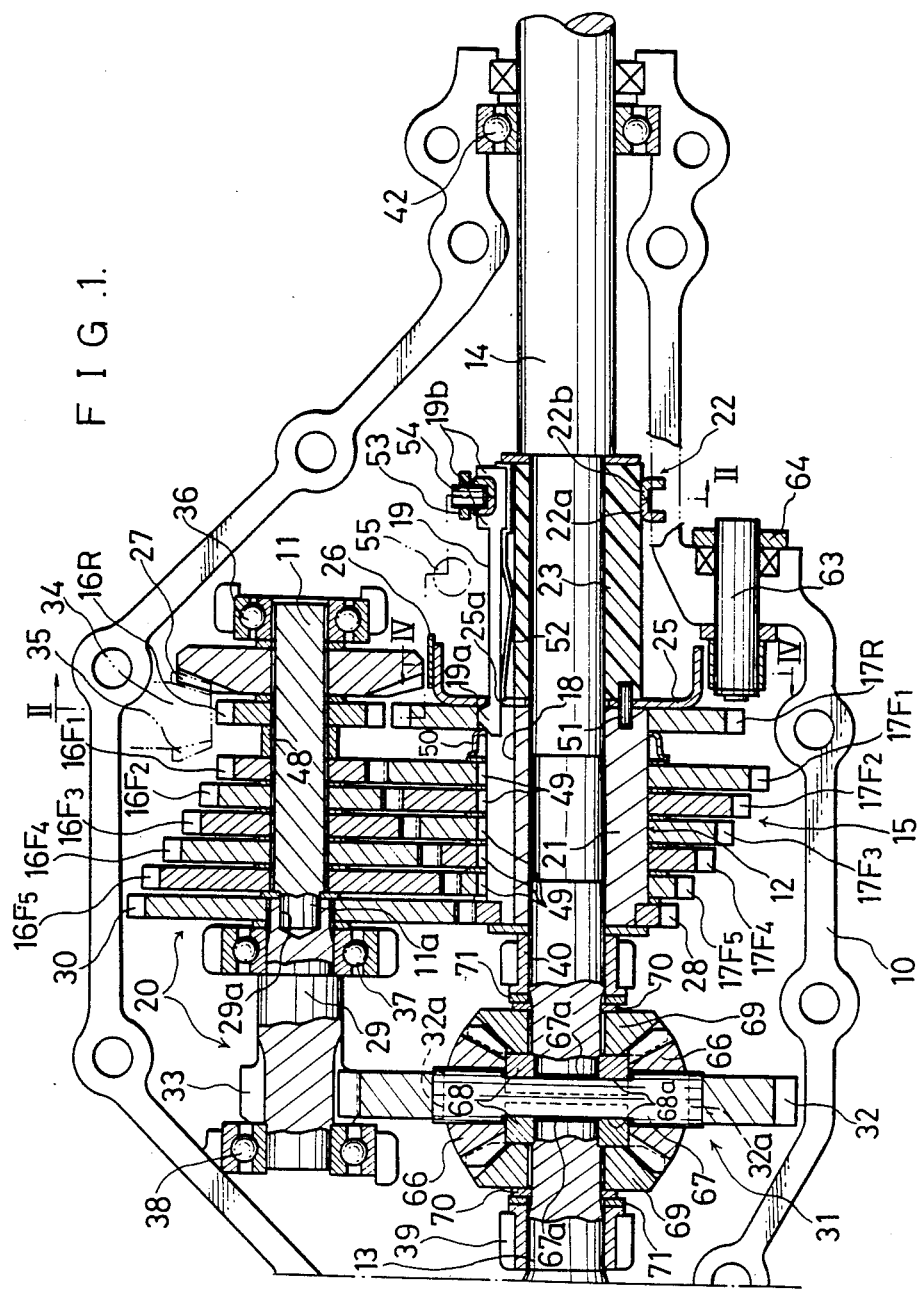
FIG. 1 is a sectional plan view, partially cut away and partially developed, of an embodiment of the transmission according to the present invention.

The present invention relates to a transmission for self-propelled working vehicles which, as depicted in FIG. 1, comprises:

a transmission casing 10 in which are arranged in parallel a drive shaft 11, a speed-change shaft 12, and co-axially disposed left and right wheel axles 13 and 14;

a key-shift transmission mechanism 15 which includes a plurality of drive gears $16F_1$, $16F_2$, $16F_3$, $16F_4$ and $16F_5$ fixedly mounted on the drive shaft 11, a plurality of speed-change gears $17F_1$, $17F_2$, $17F_3$, $17F_4$ and $17F_5$ mounted rotatably on the speed-change shaft 12 and meshed respectively with the drive gears $16F_1$–$16F_5$, and a shift key 19 disposed slidably within an elongated axial groove 18 in the outer surface of the speed-change shaft 12 and having a gear-engaging lug 19a for coupling the speed-change gears $17F_1$–$17F_5$ one at a time to the speed-change shaft 12; and a speed reduction gearing 20 interposed between the speed-change shaft 12 and the left and right wheel axles 13, 14.

As shown in FIGS. 1 to 4, the speed-change shaft 12 is divided, according to the present invention, axially into a hollow first shaft half 21, on which the speed-change gears $17F_1$, $17F_2$, $17F_3$, $17F_4$ and $17F_5$ are mounted, and a hollow second shaft half 23 on which a shifter sleeve 22 for shifting the shift key 19 to slide is slidably mounted.

A brake drum 25 having therein an aperture 25a through which the shift key 19 extends is sandwiched between and engaged to the first and second shaft halves 21 and 23 such that the brake drum 25 rotates in unison with the first and second shaft halves. The brake drum 25 is associated with a braking member 26, which is operable to brake the drum, so as to provide a brake 24 for braking the speed-change shaft 12.

One (14) of the left and right wheel axles 13 and 14 is disposed such that it extends through the first and second shaft halves 21, 23.

In the transmission according to the present invention, the key-shift transmission mechanism 15 operates to change speed of a vehicle at a low torque portion in the transmission line before the speed-reduction gearing 20, as is the case in the prior art transmission. The brake 24 operates to brake the speed-change shaft 12 so as to brake the vehicle also at such low torque portion so that such brake may be fashioned to have a small capacity.

By the first and second shaft halves 21 and 23 is provided a hollow speed-change shaft 12, through which one wheel axle 14 extends, so that three (12, 13, 14) of the plural shafts are disposed co-axially. It is thus seen that size of the transmission casing 10 may be reduced largely in a direction across the drive shaft 11, speed-change shaft 12 and wheel axles 13 and 14, as is the case of the transmission disclosed in U.S. Pat. No. 4,662,241 referred to before.

The hollow speed-change shaft 12 through which one wheel axle 14 extends may be supported rotatably by the axle 14 so that it is not required to support he change shaft by the transmission casing 10. Consequently, journal portions at both ends of the change shaft may be eliminated so as to shorten the shaft 12. The second shaft half 23 which has thereon no speed-change gears does not participate in torque transmission and functions only as a guide for the shift key 19 within the axial groove 18 therein and for the shifter sleeve 22 on the outer peripheral surface thereof. Consequently, such second shaft half 23 may be formed of an inexpensive and light-weight material such as a polymer material. The speed-change shaft 12 divided axially into two halves 21 and 23 may be machined for forming the elongated axial groove 18 with ease. In a case where the second shaft half 23 is formed of a polymer material, such axial groove 18 may be formed at the same time when the shaft half is manufactured by molding.

The brake 24 which has a brake drum 25 sandwiched between the first and second shaft halves 21 and 23 and is disposed within the transmission casing 10 does not require to project a transmission shaft outwardly of the transmission casing and eliminates a necessity of providing a brake casing. The brake drum 25 which includes an aperture 25a for passing the shift key 19 and is sandwiched between the shaft halves 21 and 23 does not require a central boss portion for fixedly mounting same on the change shaft 12 so that it is not required to lengthen the change shaft by an amount corresponding to an axial width of such boss portion.

It is thus seen that the present invention contributes largely to cost-saving, size-reducing and weight-reducing purposes for a vehicle transmission.

As the braking member for braking the brake drum 25, a brake shoe may be employed which is frictionally engageable with a part of the inner or outer circumference of the drum 25. However, it is preferred to employ a brake band 26 which may be thin enough to occupy no substantial space around the brake drum 25 and within the transmission casing 10.

The speed-reduction gearing 20 for transmitting power from the speed-change shaft 12 to the wheel axles 13 and 14 with a reduced speed of rotation is preferably provided in a fashion which will be detailed hereinafter.

As shown in FIG. 1, an input bevel gear 27 for transmitting power to the drive shaft 11 is disposed fixedly on this shaft such that the bevel gear is substantially opposed to the brake drum 25 in a direction across the drive and speed-change shafts 11 and 12. An output gear 28 is disposed fixedly on the first shaft half 21 such that the output gear is spaced from the brake drum 25 axially of the speed-change shaft 12 with the speed-change gears $17F_1$–$17F_5$ therebetween. A speed-reduction shaft 29 is disposed co-axially with the drive shaft 11 within the transmission casing 10 at a side opposite to the bevel gear 27. And, the speed-reduction gearing 20 is fashioned such that it transmits rotation from the output gear 28 to the left and right wheel axles 13 and 14 via the speed-reduction shaft 29 with a reduced speed of rotation.

As is disclosed in each of U.S. Pat. Nos. 4,103,566 and 4,662,241 and JP, A(U) No. 61-135047 which are referred to before, it is conventional in a transmission including a key-shift transmission mechanism to employ a structure such that power is supplied to a drive shaft of the key-shift transmission mechanism from an input shaft, extending perpendicularly to the drive shaft, via a bevel gearing. The arrangement, set forth above, according to the present invention that, while an input bevel gear 27 on the drive shaft 11 is disposed at a side of the brake drum 25 on the speed-change shaft 12, a speed-reduction shaft 29 is disposed at an opposite side co-axially with the drive shaft 11, permits to locate the reduction shaft 29 in proximity to the drive shaft 11 without being disturbed by a bevel gearing including the bevel gear 27 referred to above. Consequently, by employing the structure, set forth above, that the speed-change shaft 12 is connected to wheel axles 13, 14 through an output gear 28, fixedly disposed on the change shaft at a side opposite to the brake drum 25, and through the reduction shaft 29, a speed-reduction gearing having two sets of reduction gear trains may be provided by utilizing the reduction shaft 29 so as to avoid an undue enlargement of the transmission casing in the left and right direction thereof.

For locating the speed-reduction shaft 29 in close proximity to the drive shaft 11 to a maximum extent so as to minimize the enlargement of transmission casing 10 in the left and right direction, the reduction shaft 29 preferably includes at one end portion thereof an axial bore 29a in which an end portion 11a of the drive shaft 11 is journalled. A speed-reducing gear 30 which meshes with the output gear 28 on the change shaft 12 is fixedly disposed on the speed-reduction shaft 29 within an axial length of the axial bore 29a. According to this structure, one set of reduction gear train comprising meshing gears 28 and 30 is disposed within the axial length of drive shaft 11 so as to minimize the enlargement of lateral width of the transmission casing 10 and also necessity of supporting one end portion 11a of the drive shaft 11 by the casing 10 is eliminated.

The speed-reduction gearing 20 is preferably fashioned for reducing number of gears therefor such that an input gear of a differential gearing for the left and right wheel axles 13 and 14 is used as a speed-reducing gear, although such structure itself is already known as described before. Accordingly, a differential gearing 31 is disposed between the left and right wheel axles 13 and 14 and an input gear 32 of such gearing 31 is meshed with a smaller speed-reducing gear 33 which is fixedly mounted on the speed-reduction shaft 29.

DESCRIPTION OF A PREFERRED EMBODIMENT

The transmission casing 10, referred to before, which is shown in FIGS. 1, 1A and 2 is designed such that it is to be mounted on a frame structure of a small-sized working vehicle at a location between left and right drive wheels which are not shown in the drawings. As shown in FIG. 2, the casing 10 is composed of upper and lower casing halves and supports at the upper casing half a vertical input shaft 34 which extends through a top wall of the casing. The input shaft 34 has at its lower end an integral small-sized bevel gear 35 which meshes with the input bevel gear 27 referred to before.

As shown in FIGS. 1 and 1A, there are arranged in the transmission casing 10 in parallel the drive shaft 11, speed-change shaft 12, left and right wheel axles 13 and 14 and speed-reduction shaft 29 referred to before. The drive shaft 11 includes a diameter-reduced end portion 11a which is journalled in the axial bore 29a of reduction shaft 29 referred to before. The other end of drive shaft 11 and both ends of the reduction shaft 29 are supported respectively by pairs of upper and lower support walls integrally formed on inner surfaces of the upper and lower casing halves through bearings 36 and 37, 38 which are embraced by the respective pairs of upper and lower support walls. Left and right wheel axles 13 and 14 are supported respectively at inner end portions thereof by pairs of upper and lower support walls integrally formed on inner surfaces of the upper and lower casing halves through bearing sleeves 39 and 40, which are embraced by the respective pairs of upper and lower support walls, and at outer end sides thereof by the upper and lower casing halves through bearings 41 and 42 which are embraced by the upper and lower casing halves. The hollow speed-change shaft 12 which comprises the first and second shaft halves 21 and 23 set forth before is rotatably mounted on the wheel axle 14 of one side such that the change shaft is kept unmoved along the axial direction thereof.

Five drive gears $16F_1-16F_5$ and five speed-change gears 17Fhd 1-$17F_5$ are mounted respectively on the drive shaft 11 and speed-change shaft 12 so as to provide five speed-change gear trains for the forward direction drive of vehicle. For a selective rearward drive of the vehicle, another drive gear 16R, fixedly mounted on the drive shaft 11, and another speed-change gear 17R, rotatably mounted on the change shaft 12, are meshed or connected with each other via an idler gear 43 shown in phantom in FIGS. 2 and 5. Support shaft 44 for supporting the idler gear 43 rotatably is received at both ends thereof in semi-circular recesses in a pair of support walls 45 projected from the inner bottom surface of transmission casing 10 and is kept in position by a holder plate member 46 which is engaged to a flattened cut-out portion 44a of one end of the shaft 44 and is secured to one of the support walls 45 using a bolt 47. As shown in FIG. 1, the rearward direction gear 16R having a small diameter and the forward direction first speed gear $16F_1$, which is smallest of the forward direction gears $16F_1-16F_5$ on the drive shaft 12, are disposed adjacent to the bevel gear 27 on the drive shaft for avoiding an interference of the drive gears on the drive shaft 12 with the bevel gear 35 on the inner end of input shaft 34. Between the drive gears 16R and $16F_1$ is disposed a spacer ring 48. In the inner circumference of speed-change gears $17F_1-17F_5$ and 17R on the change shaft 12 are formed recesses 49 into which the gear-engaging lug 19a of shift key 19 referred to before may project. Between the forward direction first speed gear $17F_1$ and rearward direction gear 17R on the speed-change shaft 12 is disposed a neutral position ring 50 of a sheet metal material which includes therein an annular groove.

The hollow first shaft half 21 of speed-change shaft 12 is metallic, whereas the hollow second shaft half 23 is made of a polymer material such as a glass fiber-reinforced synthetic resin using a molding technique. As best seen from FIG. 3, the brake drum 25 referred to before includes a central bore 25b for passing there-through the wheel axle 14. The shaft halves 21 and 23 and brake drum 25 include respectively a suitable number of pin-fitting holes 21a, 23a and 25c which are opposed to one another. The first and second shaft halves 21 and 23 and the brake drum 25 sandwiched therebetween are engaged or connected co-rotatably using pins 51 fittingly received in the holes 21a, 23a and 25c of these members.

Two of the shift keys 19 are provided each having a leaf spring 52 attached thereto at an end portion thereof, as shown in FIGS. 1 and 3. Each key 19 and leaf spring 52 attached thereto extend through an aperture 25a of the brake drum 25 and are disposed within the elongated axial groove 18 in the outer surface of change shaft 12 such that a mid portion of the leaf spring 52 is in a slidable contact with the inner bottom surface of axial groove 18. Leaf spring 52 biases at a free end portion thereof the shift key 19 so as to project the gear-engaging lug 19a of key 19 outwardly of the elongated axial groove 18. As also shown in FIGS. 1 and 3, the shifter sleeve 22 referred to before is composed of a pair of flanged rings 22a and 22b. This shifter sleeve 22 is slidably disposed on the second shaft half 23 such that the pair of rings 22a and 22b are grippingly sandwiched between forked base end portions 19b of the shift keys 19.

As shown in FIGS. 1 and 2, a pair of shifter pins 54 attached to a shifter fork 53 are projected into an annular groove in the outer circumference of the shifter sleeve 22 so as to engage with the sleeve. As shown in FIGS. 2 and 6, the shifter fork 53 is composed of a pair of plate members 53a and 53b each having at a base end portion thereof a rectangular thorough bore 54'. Within the transmission casing 10 is disposed a vertical control shaft 55 which is supported rotatably by the top wall of transmission casing 10 and by a support wall 56 on the inner bottom surface of the casing. This control shaft 55 has a rectangular-shaped lower end portion 55a which extends through the rectangular bores 54' of plate members 53a and 53b and is fitted into a rectangular-shaped bore 58a of a cylindrical support member 58 which in turn is rotatably received in a circular bore in the support wall 56. The pair of plate members 53a and 53b are jointed together at base end portions thereof such that they are tightly sandwiched between the support member 58 and a pin 57 which extends through a pin-fitting hole in the rectangular-shaped portion 55a of control shaft 55. An upper end portion of the control shaft 55 projects upwardly from the transmission casing 10 and has a rectangular-shaped portion 55b which is fitted into correspondingly shaped bore 59a of a shifter arm 59. This shifter arm 59 is prevented from getting-away using a snap ring 60 and is connected to a change lever which is not shown in the drawings.

As shown in FIGS. 1 and 4, the brake band 26 referred to before is secured at one end thereof to a fixed pin 62 and is entrained over the brake drum 25. The other end of brake band 26 is secured to a brake control shaft 63 which extends through a sidewall of the transmission casing 10 and has at its outer end a brake arm 64 attached thereto. When the brake arm is operated using a brake lever (not shown) to rotate towards a direction of arrow A shown in FIG. 4 so as to rotate the control shaft 63 into the same direction, the brake band 26 is pulled so as to tighten the brake drum 25 whereby the brake 24 is actuated.

As shown in FIG. 1, the speed-reduction gearing 20 referred to before comprises a first reduction gear train having meshing gears 28 and 30 and a second reduction gear train having meshing gears 32 and 33. As the final gear of this reduction gearing 20, input gear 32 of the differential gearing 31 referred to before is employed. The differential gearing 31 shown does not include a differential casing.

Structure of this differential gearing 31 will be detailed hereinafter by referring to FIGS. 1 and 7. Pinion shaft 67 supporting a pair of drive pinions 66 is projected at both ends thereof into recesses 32a in the inner circumference of input gear 32 so as to rotate in unison with the input gear. This pinion shaft 67 includes at both sides thereof a pair of flattened portions 67a. A pair of left and right plate members 68 each having a central bore 68b are mounted on inner end portions of the left and right wheel axles 13 and 14. Each of the plate members 68 includes a recess 68a, the inner bottom surface of which is in abutment on each flattend portion 67a of the pinion shaft 67, and is inserted into a central bore of the input gear 32 such that a pair of end flanges 68c are in abutment against each end face of the input gear 32. A pair of driven pinions 69 meshing with the pair of drive pinions 66 are co-rotatably mounted on the left and right wheel axles 13 and 14 using a splined connection in a fashion such that each of the driven pinions 69 is in abutment against each plate member 68. A snap ring 70 abutting against each driven gear 67 is secured to each of the wheel axles 13 and 14. A ring 71 is disposed between the snap ring 70 and each of the bearing sleeves 39 and 40 which receive the inner end portions of wheel axles 13 and 14.

In the structure set forth above, an axial displacement of the input gear 32 is prevented by end flanges 68c of the plate members 68 which in turn are kept unmoved axially of the wheel axles by support walls, supporting left and right wheel axles 13 and 14 through bearing sleeves 39 and 40, via the driven pinions 69, snap rings 70, rings 71 and bearing sleeves 39 and 40. The pinion shaft 67 is prevented from rotation about its own axis due to abutment of its flattend portions 67a with the flat inner bottom surfaces of recesses 68a in the plate members 68.

Key-shift transmission mechanism 15 employed in the transmission shown changes the speed of vehicle to any of the first to fifth forward direction speeds and a rearward direction low speed by being operated so as to displace the shifter sleeve 22 axially of the speed-change shaft 12 so that the shift keys 19 are displaced to any of six operative positions where gear-engaging lugs 19a thereof project into recesses 49 of any of the change gears $17F_1$-$17F_5$ and 17R under the biasing of leaf springs 52 so as to couple such change gear to the shaft 12. A neutral condition of the key-shift transmission mechanism 15 is attained at a position of the shifter sleeve 22 where gear-engaging lugs 19a of the shift keys 19 rest in the annular groove within the neutral ring 50.

I claim:

1. A transmission for self-propelled working vehicles comprising: a transmission casing (10) in which are arranged in parallel a drive shaft (11), a speed-change shaft (12) and co-axially disposed left and right wheel axles (13, 14); a key-shift transmission mechanism (15) which includes a plurality of drive gears ($16F_1$, $16F_2$, $16F_3$, $16F_4$, $16F_5$) fixedly mounted on said drive shaft, a plurality of speed-change gears ($17F_1$, $17F_2$, $17F_3$, $17F_4$, $17F_5$) mounted rotatably on said speed-change shaft and meshed respectively with said drive gears, and a shift key (19) disposed slidably within an elongated axial groove (18) in the outer surface of said speed-change shaft and having a gear-engaging lug (19a) for coupling said speed-change gears one at a time to said speed-change shaft; and a speed-reduction gearing (20) interposed between said speed-change shaft and said left and right wheel axles, characterized in:

that said speed-change shaft (12) is divided axially into a hollow first shaft half (21), on which said speed-change gears ($17F_1$, $17F_2$, $17F_3$, $17F_4$, $17F_5$) are mounted, and a hollow second shaft half (23) on which a shifter sleeve (22) for shifting said shift key (19) to slide is slidably mounted;

that a brake drum (25) having therein an aperture (25a) through which said shift key (19) extends is sandwiched between and engaged to said first and second shaft halves (21, 23) such that said brake drum rotates in unison with said first and second shaft halves, said brake drum being associated with a braking member (26) operable to brake the drum so as to provide a brake (24) for braking said speed-change shaft (12); and that one (14) of said left and right wheel axles (13, 14) is disposed such that said one wheel axle extends through said first and second shaft halves (21, 23).

2. The transmission of claim 1, wherein said second shaft half (23) is formed of a hollow shaft of a polymer material.

3. The transmission of claim 1, wherein said brake (24) is fashioned to a band brake including as said braking member a brake band (26) which is disposed around an outer circumference of said brake drum (25).

4. The transmission of claim 1, wherein an input bevel gear (27) for transmitting power to said drive shaft (11) is disposed fixedly on the said shaft such that said bevel gear is substantially opposed to said brake drum (25) in a direction across said drive and speed-change shafts (11, 12), wherein an output gear (28) is disposed fixedly on said first shaft half (21) such that said output gear is spaced from said brake drum axially of said speed-change shaft with said speed-change gears ($17F_1$, $17F_2$, $17F_3$, $17F_4$, $17F_5$) therebetween, and wherein a speed-reduction shaft (29) is disposed co-axially with said drive shaft within said transmission casing (10) at a side opposite to said bevel gear, said speed-reduction gearing 220) being fashioned such that said gearing transmits rotation from said output gear to said left and right wheel ales (13, 14) via said speed-reduction shaft with a reduced speed of rotation.

5. The transmission of claim 4, wherein said speed-reduction shaft (29) includes at one end portion thereof an axial bore (29a) in which an end portion (11a) of said drive shaft (11) is journalled, and wherein a speed-reducing gear (30) meshing with said output gear (28) is fixedly disposed on said speed-reduction shaft within an axial length of said axial bore.

6. The transmission of claim 5, wherein a differential gearing (31) is disposed between said left and right wheel axles (13, 14), said differential gearing including an input gear (32) which meshes with a smaller speed-reducing gear (33) fixedly mounted on said speed-reduction shaft (29).

* * * * *

UNITED STATES PATENT AND TRADEMARK OFFICE
CERTIFICATE OF CORRECTION

PATENT NO. : 4,932,278

DATED : June 12, 1990

INVENTOR(S) : Shusuke Nemoto

It is certified that error appears in the above-identified patent and that said Letters Patent is hereby corrected as shown below:

Title page, [57]:
In the abstract, line 11, delete "prividing" and substitute therefor -- providing --.

Column 3, line 14, after "idler" delete ",".

Column 4, line 14, after "support" delete "he" and substitute therefor -- the --.

Column 6, line 30, delete "17Fhd 1-17F$_5$" and substitute therefor -- 17F$_1$-17F$_5$ --.

Column 10, line 14, delete "220)" and substitute therefor -- (20) --.

Column 10, line 16, delete "ales" and substitute therefor --axles --.

Signed and Sealed this

Seventeenth Day of September, 1991

Attest:

HARRY F. MANBECK, JR.

*Attesting Officer*  *Commissioner of Patents and Trademarks*